United States Patent
Yamada et al.

(10) Patent No.: US 8,522,532 B2
(45) Date of Patent: Sep. 3, 2013

(54) EXHAUST TREATMENT DEVICE FOR A DIESEL ENGINE

(75) Inventors: Shuichi Yamada, Sakai (JP); Yasuo Fujii, Sakai (JP); Katsushi Inoue, Sakai (JP); Yuuki Ishii, Sakai (JP); Kenta Mitamura, Sakai (JP)

(73) Assignee: KUBOTA Corporation, Osaka (JP)

(*) Notice: Subject to any disclaimer, the term of this patent is extended or adjusted under 35 U.S.C. 154(b) by 38 days.

(21) Appl. No.: 13/390,815

(22) PCT Filed: Aug. 3, 2010

(86) PCT No.: PCT/JP2010/063067
§ 371 (c)(1),
(2), (4) Date: Feb. 16, 2012

(87) PCT Pub. No.: WO2011/021497
PCT Pub. Date: Feb. 24, 2011

(65) Prior Publication Data
US 2012/0144811 A1 Jun. 14, 2012

(30) Foreign Application Priority Data
Aug. 20, 2009 (JP) .................... 2009-190843

(51) Int. Cl.
*F01N 3/00* (2006.01)
(52) U.S. Cl.
USPC .......... 60/285; 60/289; 60/290; 60/297
(58) Field of Classification Search
USPC ................................. 60/274–324
See application file for complete search history.

(56) References Cited

U.S. PATENT DOCUMENTS 5,287,698 A * 2/1994 Shinzawa et al. ............ 60/286
6,952,919 B2 * 10/2005 Otake et al. .................. 60/297

(Continued)

FOREIGN PATENT DOCUMENTS

JP 2005-113752 A 4/2005
JP 2007-023883 A 2/2007

(Continued)

OTHER PUBLICATIONS

Int'l Search Report issued Oct. 19, 2010 in Int'l Application No. PCT/JP2010/063067.

*Primary Examiner* — Thomas Denion
*Assistant Examiner* — Jesse Bogue
(74) *Attorney, Agent, or Firm* — Panitch Schwarze Belisario & Nadel LLP

(57) ABSTRACT

Provided is an exhaust-treatment device for a diesel engine, said device being capable of suppressing engine noise. In a first stage P1 of an exhaust-temperature-raising process, a target engine speed is set to a prescribed first target speed R1 and an intake throttle valve 41 is set to a prescribed first degree of opening O1. In a second stage P2, the target engine speed is maintained at the first target speed R1 and the intake throttle valve 41 is set to a position more closed than the first degree of opening O1. When a set duration T2 for the second stage P2 has come to an end, the intake throttle valve 41 is at a second degree of opening O2, which is maintained in third and subsequent stages P3/P4. In said third and subsequent stages P3/P4, as a set duration T3/T4 for each stage P3/P4 passes, the target engine speed is updated to a target speed R2/R3 higher than the target speed R1/R2 during the immediately prior stage P2/P3, and the temperature of DPF1 upstream exhaust gas 12 is increased.

6 Claims, 5 Drawing Sheets

(56) References Cited

U.S. PATENT DOCUMENTS

| | | |
|---|---|---|
| 7,237,379 B2 * | 7/2007 | Nakano et al. .................. 60/295 |
| 7,992,383 B2 | 8/2011 | Onodera et al. |
| 2009/0235644 A1 | 9/2009 | Wu et al. |
| 2009/0288398 A1 * | 11/2009 | Perfetto et al. .................. 60/287 |
| 2010/0293923 A1 * | 11/2010 | Yokoi .................. 60/273 |

FOREIGN PATENT DOCUMENTS

| | | |
|---|---|---|
| JP | 2007-205240 A | 8/2007 |
| JP | 2007-255304 A | 10/2007 |

* cited by examiner

EXHAUST TREATMENT DEVICE FOR A DIESEL ENGINE

CROSS-REFERENCE TO RELATED APPLICATION

This application is a Section 371 of International Application No. PCT/JP2010/063067, filed Aug. 3, 2010, which was published in the Japanese language on Feb. 24, 2011, under International Publication No. WO 2011/021497 A1, and the disclosure of which is incorporated herein by reference.

TECHNICAL FIELD

The present invention relates to an exhaust treatment device for a diesel engine and, more particularly, to the exhaust treatment device for a diesel engine which can suppress engine noise.

From among terms in this specification and the claims, a DPF is an abbreviation of a diesel particulate filter, a DOC is an abbreviation of an oxidization catalyst used as a combustion catalyst, and a PM is an abbreviation of particulate material included in an exhaust gas.

BACKGROUND ART OF THE INVENTION

In the regeneration of a DPF for removing PM accumulated on the DPF by burning the PM using heat of an exhaust gas, there is a conventional exhaust treatment device for a diesel engine in which the temperature of the exhaust gas on the upstream side of the DPF is raised by increasing the target rotation number of the engine so that the main injection of fuel is increased (refer to FIG. 9 of Patent Document 1).

According to this kind of the device, there is an advantage in that the regeneration of the DPF can be accelerated by a rise in the temperature of the exhaust gas.

In this conventional technology, however, a problem arises because the target rotation number of the engine is suddenly raised all at once.

[Patent Document 1] Japanese Patent Publication No. 2005-113752

SUMMARY OF THE INVENTION

Problems to be Resolved by the Invention

<<Problem>> Engine noise is increased.

Since the target rotation number of the engine is suddenly raised all at once, the rotation number of the engine is suddenly raised, thereby increasing engine noise.

The object of the invention is to provide the exhaust treatment device for a diesel engine which is capable of suppressing engine noise.

Means of Solving the Problems

The characteristic of an invention according to claim 1 is as follows.

As illustrated in FIG. 1, the exhaust treatment device for a diesel engine includes a DPF 1, an exhaust gas temperature sensor 40 for detecting a temperature of an exhaust gas 12 on the upstream side of the DPF 1, an intake throttle valve 41, control means 14, and memory means 5, as illustrated in FIG. 2, wherein a target temperature DT of the exhaust gas 12 on the upstream side of the DPF 1, a first valve opening degree O1 of the intake throttle valve 41, and set durations T1, T2, T3, and T4 for stage processings of exhaust gas temperature rise processing are stored in the memory means 5, and in the regeneration of the DPF 1 for burning and removing PM, accumulated on the DPF 1, by using heat of the exhaust gas 11, the control means 14 performs the first stage processing P1 of the exhaust gas temperature rise processing, wherein in the first stage processing P1, the target rotation number of the engine is set to a predetermined first target rotation number R1 and the opening degree of the intake throttle valve 41 is set to the first valve opening degree O1, if the temperature of the exhaust gas 12 on the upstream side of the DPF 1 does not reach the target temperature DT and the set duration T1 of the first stage processing P1 has elapsed, the control means 14 performs the second stage processing P2 of the exhaust gas temperature rise processing, wherein in the second stage processing P2, the target rotation number of the engine is maintained at the first target rotation number R1 and the opening degree of the intake throttle valve 41 is more closed than the first valve opening degree O1, and if the temperature of the exhaust gas 12 on the upstream side of the DPF 1 does not reach the target temperature DT and the set duration T2 of the second stage processing P2 has elapsed, the control means 14 performs the stage processings P3 and P4 in and after the third step of the exhaust gas temperature rise processing, wherein in the stage processings P3 and P4 in and after the third step, the opening degree of the intake throttle valve 41 is maintained at a second valve opening degree O2 at the time when the set duration T2 of the second stage processing P2 has elapsed until the temperature of the exhaust gas 12 on the upstream side of the DPF 1 reaches the target temperature DT, and the temperature of the exhaust gas 12 on the upstream side of the DPF 1 is raised by updating the target rotation number of the engine into target rotation numbers R2 and R3, each higher than each of the target rotation numbers R1 and R2 of the stage processings P2 and P3 right before, based on an elapse of the set durations T3 and T4 of the stage processings P3 and P4.

Advantageous Effects of the Invention (An Invention According to Claim 1)

An invention according to claim 1 has the following effect.

<<Effect>> Engine noise can be suppressed.

As illustrated in the drawings, in the first stage processing P1 of the exhaust gas temperature rise processing, the target rotation number of the engine is set to a predetermined first target rotation number R1 and the opening degree of the intake throttle valve 41 is set to the first valve opening degree O1. In the second stage processing P2, the target rotation number of the engine is maintained at the first target rotation number R1 and the opening degree of the intake throttle valve 41 is more closed than the first valve opening degree O1. In the stage processings P3 and P4 in and after the third step, the opening degree of the intake throttle valve 41 is maintained at the second valve opening degree O2 at the time when the set duration T2 of the second stage processing P2 has elapsed until the temperature of the exhaust gas 12 on the upstream side of the DPF 1 reaches the target temperature DT, and the target rotation number of the engine is updated into target rotation numbers R2 and R3, each higher than each of the target rotation numbers R1 and R2 of the stage processings P2 and P3 right before, based on an elapse of the set durations T3 and T4 of the stage processings P3 and P4.

As described above, in the first stage processing P1, the first target rotation number R1 has a relatively low value, and the temperature of the exhaust gas 12 on the upstream side of the DPF 1 is raised. In the second stage processing P2, in the state where the first target rotation number R1 of a low value is maintained, the valve opening degree of the intake throttle valve 41 is more closed, and the temperature of the exhaust gas 12 is further raised. In the stage processings P3 and P4 in and after the third step, the target rotation number of the engine is updated into higher values R2 and R3 step by step so that the temperature of the exhaust gas 12 can be further raised. Accordingly, engine noise can be suppressed because a sudden rise in the rotation number of the engine can be prevented.

(An Invention According to Claim 2)

An invention according to claim 2 has the following effect in addition to the effect of the invention according to claim 1.

<<Effect>> The temperature of the exhaust gas on the upstream side of the DPF can remain intact even after it reaches a target temperature.

As illustrated in FIG. 2, when the temperature of the exhaust gas 12 on the upstream side of the DPF 1 reaches the target temperature DT, the control means 14 maintains the target rotation numbers R1, R2, and R3 and the opening degrees O1 and O2 of the intake throttle valve 41 at that time for a predetermined time period since that time. Accordingly, the temperature of the exhaust gas 12 on the upstream side of the DPF 1 can remain intact even after it reaches the target temperature DT.

(An Invention According to Claim 3)

The invention according to claim 3 has the following effect in addition to the effect of the invention according to claim 1 or claim 2.

<<Effect>> The regeneration of the DPF is rapidly performed.

As illustrated in FIGS. 1 and 4, when the temperature of the exhaust gas 12 on the upstream side of the DPF 1 reaches the target temperature DT, the control means 14 adds unburnt fuel to the exhaust gas 12 on the upstream side of the DPF 1 through the fuel addition means 42 so that the unburnt fuel is burnt by oxygen included in the exhaust gas 12. Accordingly, the regeneration of the DPF 1 is rapidly performed because the temperature of the exhaust gas 12 is further raised by the combustion of the unburnt fuel.

(An Invention According to Claim 4)

The invention according to claim 4 has the following effect in addition to the effect of the invention according to claim 3.

<<Effect>> Unburnt fuel is rapidly burnt.

As illustrated in FIG. 1, the DOC 10 is disposed on the upstream side of the DPF 1, so that the DOC 10 catalytically burns unburnt fuel using oxygen included in the exhaust gas 12. Accordingly, the unburnt fuel is rapidly burnt even when the temperature of the exhaust gas 12 in which the unburnt fuel is mixed is low.

(An Invention According to Claim 5)

The invention according to claim 5 has the following effect in addition to the effect of the invention according to any one of claims 1 to 4.

<<Effect>> The operation of a machine on which the engine is mounted is not hindered.

The exhaust gas temperature rise processing is performed during the non-operation of a machine on which the engine is mounted, in which both the driving and working of the machine are stopped, but is not performed during the operation of the machine in which at least one of the driving and working of the machine is performed. Accordingly, the operation of the machine on which the engine is mounted is not hindered by a shift in the target rotation number of the engine.

(An Invention According to Claim 6)

The invention according to claim 6 has the following effect in addition to the effect of the invention according to any one of claims 1 to 5.

<<Effect>> The size of the exhaust treatment device can be reduced.

As illustrated in FIG. 1, the temperature of the exhaust gas 12 on the upstream side of the DPF 1 is raised even without installing an exhaust throttle valve by controlling the intake throttle valve 41 and step by step updating the target rotation number of the engine. Accordingly, the size of the exhaust treatment device can be reduced because a space where the exhaust throttle valve will be disposed is not required in the exhaust treatment device.

MODE FOR CARRYING OUT THE INVENTION

FIGS. 1 to 5 are diagrams illustrating a diesel engine equipped with an exhaust treatment device according to an embodiment of the present invention. In the present embodiment, a multi-cylinder diesel engine of a common rail type, including an exhaust treatment device, is described below.

Figure 1:
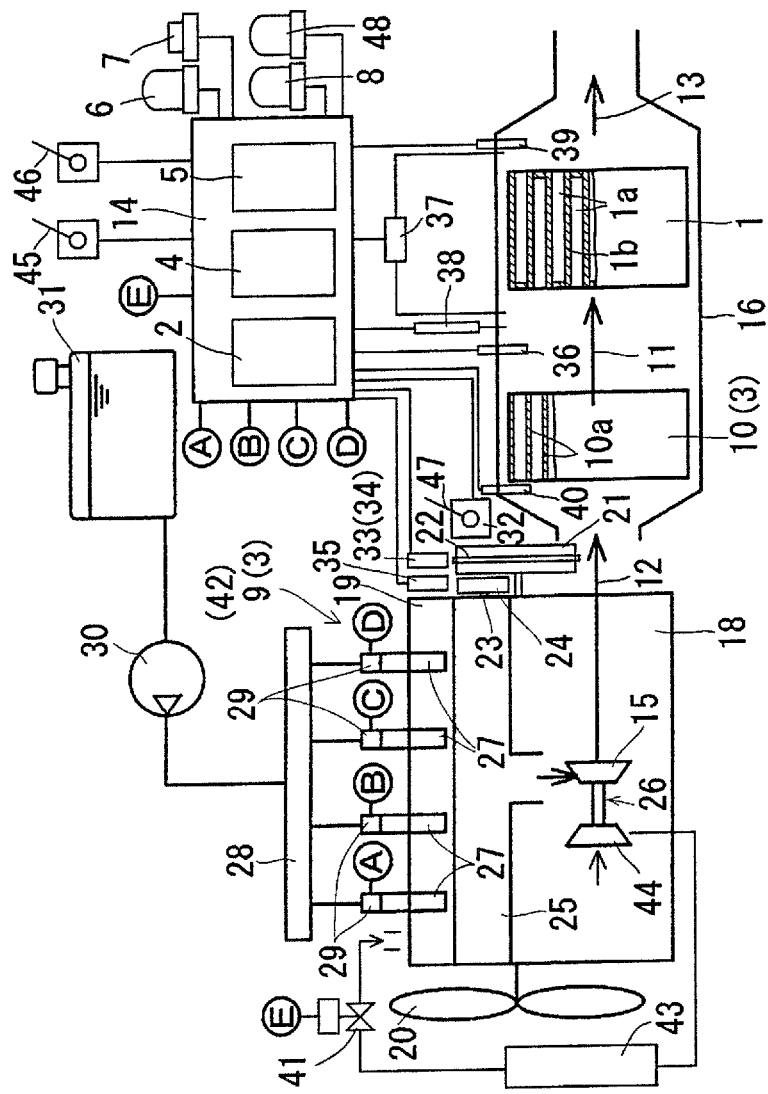
FIG. 1 is a diagram showing a diesel engine equipped with an exhaust treatment device according to an embodiment of the present invention.

The outline of the diesel engine shown in FIG. 1 is as follows.

A cylinder head 19 is assembled over a cylinder block 18, an engine cooling fan 20 is disposed in the front part of the cylinder block 18, a flywheel 21 is disposed in the back part of the cylinder block 18, and a rotor plate 22 is mounted on the flywheel 21. Furthermore, a sensor plate 24 mounted on an actuation valve cam shaft 23 is disposed in the back part of the cylinder block 18. An exhaust manifold 25 is disposed on one side of the cylinder head 19, and a surcharger 26 communicates with the exhaust manifold 25. A DPF casing 16 in which the DPF 1 is accommodated is disposed on the downstream side of the turbine 15 of the surcharger 26. A DOC 10 is also accommodated in the DPF casing 16. An injector 27 is disposed in each cylinder in the cylinder head 19. Each of the injectors 27 is coupled to a common rail 28. Electromagnetic valves 29 are provided in the respective injectors 27. A fuel tank 31 is coupled to the common rail 28 through a fuel supply pump 30. An intake manifold (not shown) communicates with the compressor 44 of the surcharger 26 through an intercooler 43. An intake throttle valve 41 is provided on the downstream side of the intercooler 43, so that the intake throttle valve 41 is associated with control means 14.

The target rotation number setting means 32 of the engine, the rotation number detection means 33 of the engine, crank angle detection means 34, and cylinder determination means 35 are associated with the electromagnetic valves 29 of the injectors 27 through the control means 14. The target rotation number setting means 32 of the engine is a potentiometer for outputting the target rotation number of the engine as a voltage value from a position where a speed control lever 47 is set.

The rotation number detection means 33 of the engine and the crank angle detection means 34 are pickup coils facing the outer circumference of the rotor plate 22 and are configured to detect the rotation number of the engine and a crank angle by detecting the number of sawteeth which are provided in large number on the outer circumference of the rotor plate 22 at constant intervals. The cylinder determination means 35 is a sensor for determining that the combustion cycle of each cylinder is placed at what cycle by detecting protrusions provided in the sensor plate 24. The control means 14 is an engine ECU. The ECU is an abbreviation of an electronic control unit.

The control means 14 controls the opening valve timing and the opening valve duration of the electromagnetic valves 29 of the injectors 27 so that a variation between the target rotation number of the engine and the rotation number of the engine is small and performs the main injection of a predetermined amount of fuel on predetermined injection timing from the injectors 27 to a combustion chamber.

The configuration of the exhaust treatment device is as follows.

As shown in FIG. 1, the DPF 1, the PM accumulation estimation means 2 of PM accumulated on the DPF 1, DPF regeneration means 3, DPF regeneration control means 4, memory means 5, acceleration regeneration request information alarm means 6, and acceleration regeneration start manipulation means 7 are included.

The DPF 1 is a honeycomb carrier of ceramics and is a wall flow monolith in which the end parts of adjacent cells 1a are alternately blocked. The PM of an exhaust gas, passing through the inside of the cells 1a and the walls 1b of the cells 1a, is captured by the walls 1b of the cells 1a.

The PM accumulation estimation means 2 is the operation part of the engine ECU that is the control means 14 and is configured to estimate the amount of accumulated PM from experimentally obtained map data on the basis of an engine load, the rotation number of the engine, an exhaust gas temperature detected by the DPF upstream-side exhaust gas temperature sensor 36, an exhaust pressure detected by a DPF upstream-side exhaust pressure sensor 38, a differential pressure between the upstream and downstream sides of the DPF 1 detected by a differential sensor 37.

The DPF regeneration means 3 consists of a combination of the common rail system 9 and the DOC 10 disposed on the upstream of the DPF 1. The DPF regeneration means 3 performs normal regeneration processing and acceleration regeneration processing so that unburnt fuel is mixed in an exhaust gas by post injection which is performed after main injection from the injectors 27 of the common rail system 9, the DOC 10 oxidizes and burns the unburnt fuel using oxygen of the exhaust gas, and the temperature of the exhaust gas 11 passing through the DPF 1 is raised.

The DOC 10 is a honeycomb carrier of ceramics. The DOC 10 has a flow-through structure having an oxidization catalyst contained therein and having both ends of the cells 10a opened. The exhaust gas 12 passes through the inside of the cells 10a.

If the temperature of the DOC upstream-side exhaust gas 12, detected by the DOC upstream-side exhaust gas temperature sensor 40, is lower than the activation temperature of the DOC 10, exhaust gas temperature rise processing for raising the temperature of the exhaust gas 12 on the upstream side of the DOC 10 is performed. In case of acceleration regeneration processing, the opening degree of the intake throttle valve 41 is narrowed to increase the target rotation number of the engine step by step. Accordingly, the temperature of the exhaust gas 12 on the upstream side of the DOC 10 is raised up to a target exhaust gas temperature DT in order to activate the DOC 10. After the activation temperature of the DOC 10 is reached, post injection is performed after the main injection, and the temperature of the exhaust gas 11 on the upstream side of the DPF 1 is raised.

If the temperature of a DPF downstream-side exhaust gas 13, detected by the DPF downstream-side exhaust gas temperature sensor 39, is higher than a predetermined abnormal determination temperature, the DPF regeneration control means 4 starts the alarm of DPF abnormal information through DPF abnormal information alarm means 8 and, at the same time, stops the post injection or decreases the amount of injection in the post injection.

The DPF regeneration means 3 consists of a combination of the injectors for injecting fuel into an exhaust pipe and the DOC 10, but may include an electric heater disposed at the entrance of the DPF 1.

The DPF regeneration control means 4 is provided in the engine ECU that is the control means 14.

The memory means 5 is memory provided in the engine ECU that is the control means 4.

Figure 5:
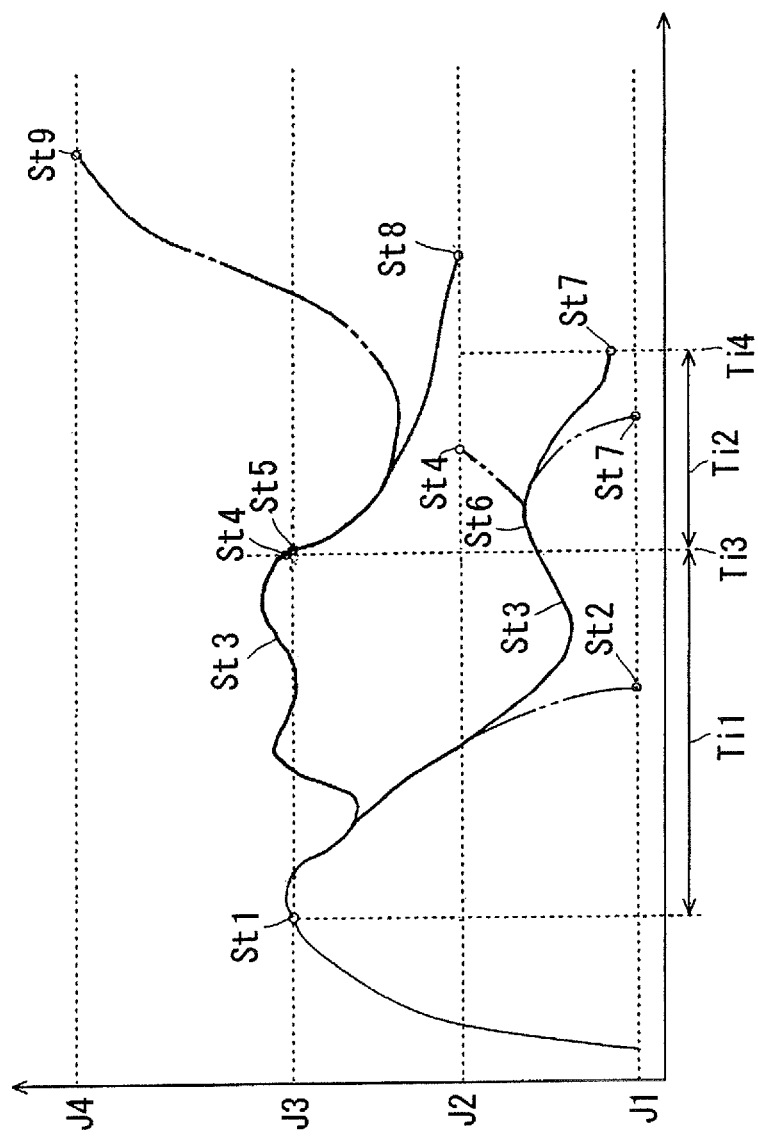
FIG. 5 is a time chart of regeneration processing using the exhaust treatment device of FIG. 1.

A plurality of determination values J1, J2, and J3 regarding a PM accumulation estimation value and a determination reservation period T1 of an acceleration regeneration request are stored in the memory means 5. As shown in FIG. 5, the plurality of determination values J1, J2, and J3 are sequentially in the order of smallest to largest a normal regeneration end determination value J1, an acceleration regeneration request determination value J2, and a normal regeneration start determination value J3.

As shown in FIG. 5, the DPF regeneration control means 4 compares a PM accumulation estimation value, estimated by the PM accumulation estimation means 2, and each of the plurality of determination values J1, J2, and J3. If the PM accumulation estimation value rises up to the normal regeneration start determination value J3, the DPF regeneration control means 4 automatically starts (St1) normal regeneration processing using the DPF regeneration processing means 3 so that the temperature of the exhaust gas 11 passing through the DPF 1 is raised.

If the PM accumulation estimation value drops to the normal regeneration end determination value J1 during an acceleration regeneration request determination reservation period Ti1 from beginning of the normal regeneration processing, the DPF regeneration control means 4 terminates (St2) the normal regeneration processing. If the PM accumulation estimation value does not drop to the normal regeneration end determination value J1, the DPF regeneration control means 4 continues (St3) the normal regeneration processing. In the state where the normal regeneration processing is continued (St3), a point of time at which the acceleration regeneration request determination reservation period Ti1 has elapsed is an acceleration regeneration request determination time Ti3. If the PM accumulation estimation value is equal to or higher than the acceleration regeneration request determination value J2 at the acceleration regeneration request determination time Ti3, the DPF regeneration control means 4 determines that there is an acceleration regeneration request and thus starts (St4) the alarm of the acceleration regeneration request information through the acceleration regeneration request information alarm means 6. If the acceleration regeneration start is manipulated by the acceleration regeneration start manipulation means 7, the DPF regeneration control means 4 switches (St5) the normal regeneration processing to the acceleration regeneration processing through the DPF regeneration means 3 and raises the temperature of the exhaust gas 11 passing through the DPF 1 so that the regeneration speed of the DPF 1 is accelerated as compared with the normal regeneration processing.

In the acceleration regeneration processing, the amount of injection of the main injection or the post injection is increased as compared with the normal regeneration processing, so that the temperature of the exhaust gas 11 is further raised and thus the regeneration speed of the DPF 1 is accelerated.

As shown in FIG. 1, the acceleration regeneration request information alarm means 6 is a lamp provided in the dashboard of a machine on which diesel engine is mounted. Acceleration regeneration request information is alarmed by turning on the lamp.

The acceleration regeneration start manipulation means 7 is a manipulation button provided in the dashboard. A driver, etc. performs an acceleration regeneration start by manually pressing the manipulation button.

Meanwhile, if an acceleration regeneration start is not manipulated by the acceleration regeneration start manipulation means 7 although acceleration regeneration request information is alarmed by the acceleration regeneration request information alarm means 6, normal regeneration processing continues. Furthermore, if acceleration regeneration request information is not alarmed by the acceleration regeneration request information alarm means 6, acceleration regeneration processing is not performed even though an acceleration regeneration start is manipulated by the acceleration regeneration start manipulation means 7.

As shown in FIG. 5, an acceleration regeneration request redetermination period Ti2 is stored in the memory means 5. Thus, if a PM accumulation estimation value is lower than the acceleration regeneration request determination value J2 at the acceleration regeneration request determination time Ti3, the DPF regeneration control means 4 determines that there is no acceleration regeneration request and thus enters the acceleration regeneration request redetermination period Ti2 subsequent to the acceleration regeneration request determination time Ti3 and then continues (St6) the normal regeneration processing. If the PM accumulation estimation value drops to the normal regeneration end determination value J1 in the acceleration regeneration request redetermination period T2, the DPF regeneration control means 4 terminates (St7) the normal regeneration processing. If the PM accumulation estimation value rises up to the acceleration regeneration request determination value J2, the DPF regeneration control means 4 determines that there is an acceleration regeneration request and starts (St4) the alarm of the acceleration regeneration request information through the acceleration regeneration request information alarm means 6. Next, the DPF regeneration control means 4 performs the same processing as processing after the alarm of the acceleration regeneration request information is started (St4).

A point of time at which the acceleration regeneration request redetermination period Ti2 has elapsed is a redetermination end time Ti4. If the DPF accumulation estimation value does not rise up to the acceleration regeneration request determination value J2 at the redetermination end time Ti4, the DPF regeneration control means 4 terminates (St7) the normal regeneration processing even though the PM accumulation estimation value has not dropped to the normal regeneration end determination value J1.

As an example where the DPF regeneration control means 4 performs acceleration regeneration processing through the DPF regeneration means 3, if a PM accumulation estimation value drops to the acceleration regeneration request determination value J2 which is the lowest limit of an acceleration regeneration request, the DPF regeneration control means 4 terminates (St8) the acceleration regeneration processing.

The exhaust treatment device includes the DPF abnormal information alarm means 8 as shown in FIG. 1, and a DPF abnormal determination value J4 higher than the normal regeneration start determination value J3 is stored in the memory means 5 as shown in FIG. 5. If a PM accumulation estimation value rises up to the DPF abnormal determination value J4, the DPF regeneration control means 4 starts (St9) the alarm of the DPF abnormal information through the DPF abnormal information alarm means 8.

As shown in FIG. 1, the DPF abnormal information alarm means 8 is a lamp provided in the dashboard of a machine on which a diesel engine is mounted. DPF abnormal information is alarmed by turning on the lamp.

The diesel engine equipped with the exhaust treatment device is mounted on agricultural machines, such as combines, and construction machines, such as backhoes. The normal regeneration processing is performed either during the operation of a machine on which the engine is mounted, in which at least one of the driving and working of the machine is performed or during the non-operation of the machine in which both the driving and working of the machine are stopped. The acceleration regeneration processing is not performed during the operation of the machine, but is performed only during the non-operation of the machine.

As shown in FIG. 1, if, during the operation of the engine, three conditions, including a condition that the transmission lever 45 for automatic transmission is placed at a neutral position, a condition that the rotation number of the engine is in an idle rotation region, and a condition that a side brake 46 is pulled, are satisfied, the three conditions are detected by the sensor and the control means 14 determines that the machine is not operating based on the detection. If one of the three conditions is not satisfied during the operation of the engine, the control means 14 determines that the machine is operating.

If the two conditions, including the condition that the transmission lever 45 for automatic transmission is placed at the neutral position and the condition that the rotation number of the engine is in the idle rotation region, except the condition regarding the side brake 46, are satisfied from among the three conditions, the two conditions are detected by the sensor, and the control means 14 determines that the machine is not operating based on the detection. If one of the two conditions is not satisfied during the operation of the engine, the control means 14 may determine that the machine is operating.

In the acceleration regeneration processing, processing for activating the DOC is as follows.

Figure 2:
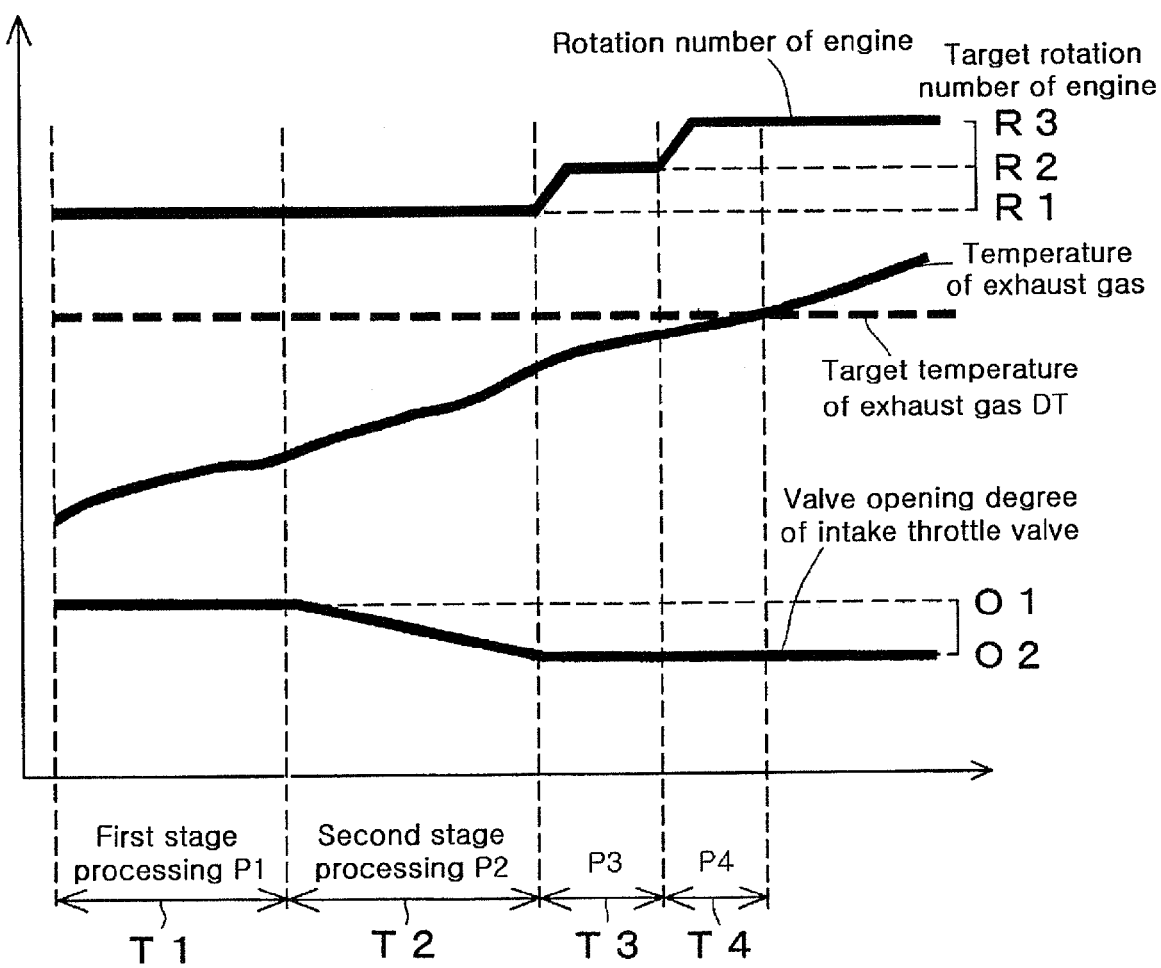
FIG. 2 is a time chart of exhaust gas temperature rise processing in acceleration regeneration processing using the exhaust treatment device of FIG. 1.

As shown in FIG. 2, the target temperature DT of the exhaust gas 12 on the upstream side of the DPF 1, the first valve opening degree O1 of the intake throttle valve 41, and the set durations T1, T2, T3, and T4 for the stage processings of the exhaust gas temperature rise processing are stored in the memory means 5.

The control means 14 performs the first stage processing P1 of the exhaust gas temperature rise processing so that the target rotation number of the engine becomes a predetermined first target rotation number R1 and the opening degree of the intake throttle valve 41 becomes the first valve opening degree O1 in the first stage processing P1.

The target temperature DT is the activation temperature of the DOC 10, the first target rotation number R1 is an idle rotation number, and the first valve opening degree O1 is an opening degree close to full opening. The first target rotation number R1 is a preset value and stored in the memory means 5.

The first target rotation number R1 may not be a preset value, but may be an idle rotation number artificially set by the speed control lever 47.

If the temperature of the exhaust gas 12 on the upstream side of the DPF 1 does not reach the target temperature DT and a set duration T1 of the first stage processing P1 elapses, the control means 14 performs the second stage processing P2 of the exhaust gas temperature rise processing so that the target rotation number of the engine is maintained at the first target rotation number R1 and the opening degree of the intake throttle valve 41 is more closed than the first valve opening degree O1 in the second stage processing P2.

The opening degree of the intake throttle valve 41 is controlled by feedback control in which the opening degree of the intake throttle valve 41 is more closed than the first valve opening degree O1, while feeding back the temperature of the exhaust gas 12 on the upstream of the DOC 10.

The opening degree of the intake throttle valve 41 may be controlled by feed forward control in which the opening degree of the intake throttle valve 41 is a preset value that is more closed than the first valve opening degree O1 without feeding back the temperature of the exhaust gas 12 on the upstream of the DOC 10.

If the temperature of the exhaust gas 12 on the upstream side of the DPF 1 does not reach the target temperature DT and a set duration T2 of the second stage processing P2 elapses, the control means 14 performs the stage processings P3 and P4 in and after the third step of the exhaust gas temperature rise processing. Accordingly, in the stage processings P3 and P4 in and after the third step, the opening degree of the intake throttle valve 41 is maintained at the second valve opening degree O2 after the set duration T2 of the second stage processing P2 elapses until the temperature of the exhaust gas 12 on the upstream side of the DPF 1 reaches the target temperature DT, and the temperature of the exhaust gas 12 on the upstream side of the DPF 1 is raised by updating the target rotation number of the engine into the target rotation numbers R2 and R3, each higher than the target rotation numbers R1 and R2 of the stage processings P2 and P3 right before, on the basis of an elapse of the set durations T3 and T4 of the stage processings P3 and P4.

The target rotation numbers R2 and R3 of the stage processings P3 and P4 in and after the third step are preset values and stored in the memory means 5. The highest target rotation number R3 is set to an upper limit target rotation number or less in which a tolerance limit of noise is taken into consideration.

If the first target rotation number R1 is not a preset value and an idle rotation number artificially set by the speed control lever 47, the target rotation numbers R2 and R3 of the stage processings P3 and P4 in and after the third step are not preset values, but are values in which predetermined rotation numbers are sequentially added to the first target rotation number R1. In this case, if the target rotation number R3 exceeds the upper limit target rotation number in which the tolerance limit of noise is taken into consideration, abnormality of the activation of a catalyst is alarmed and the temperature-raising processing is terminated.

In the present embodiment, the third stage processing P3 and the fourth stage processing P4 have been set as the stage processings P3 and P4 in and after the third step, but processings in the fifth step and subsequent steps may be set.

When the temperature of the exhaust gas 12 on the upstream side of the DPF 1 reaches the target temperature DT, the control means 14 maintains the target rotation numbers R1, R2, and R3 and the opening degrees O1 and O2 of the intake throttle valve 41 at that time for a predetermined time period since that time.

In the present embodiment, the maintenance time is set to range from the time when the temperature of the exhaust gas 12 on the upstream side of the DPF 1 reaches the target temperature DT to the time when the acceleration regeneration processing is terminated by performing the post injection.

Since the temperature of the DOC 10 is raised by the post injection, the maintenance time may be set to range from the time the temperature of the exhaust gas 12 on the upstream side of the DPF 1 reaches the target temperature DT to the time before the acceleration regeneration processing is terminated by performing the post injection.

After the maintenance time, the intake throttle valve 41 is fully opened or almost fully opened, so that the target rotation numbers R2 and R3 return to the first target rotation number R1.

When the temperature of the exhaust gas 12 on the upstream side of the DPF 1 reaches the target temperature DT, the control means 14 adds unburnt fuel to the exhaust gas 12 on the upstream side of the DPF 1 through the fuel addition means 42 in order to burn the unburnt fuel using oxygen included in the exhaust gas 12.

The fuel addition means 42 is a common rail, and the fuel addition method is the post injection after the main injection.

A fuel injection nozzle (not shown) may be used as the fuel addition means 42 in the exhaust pipe, and a method of injecting fuel into the exhaust pipe from the fuel injection nozzle may be used as the fuel addition method.

In the present embodiment, since the DOC 10 is disposed on the upstream side of the DPF 1, the DOC 10 catalytically burns the unburnt fuel by using oxygen included in the exhaust gas 12.

The exhaust gas temperature rise processing is performed during the non-operation of a machine on which the engine is mounted, in which both the driving and working of the machine are stopped, but is not performed during the operation of the machine in which at least one of the driving and working of the machine is performed because the exhaust gas temperature rise processing is performed when the acceleration regeneration is performed.

In the present embodiment, the temperature of the exhaust gas 12 on the upstream side of the DPF 1 can be raised even without installing an exhaust throttle valve by controlling the intake throttle valve 41 and step by step updating the target rotation number of the engine.

After the DOC 10 is activated, the post injection is performed, and a processing flow of the control means 14 until the acceleration regeneration processing is terminated is as follows.

Figure 3:
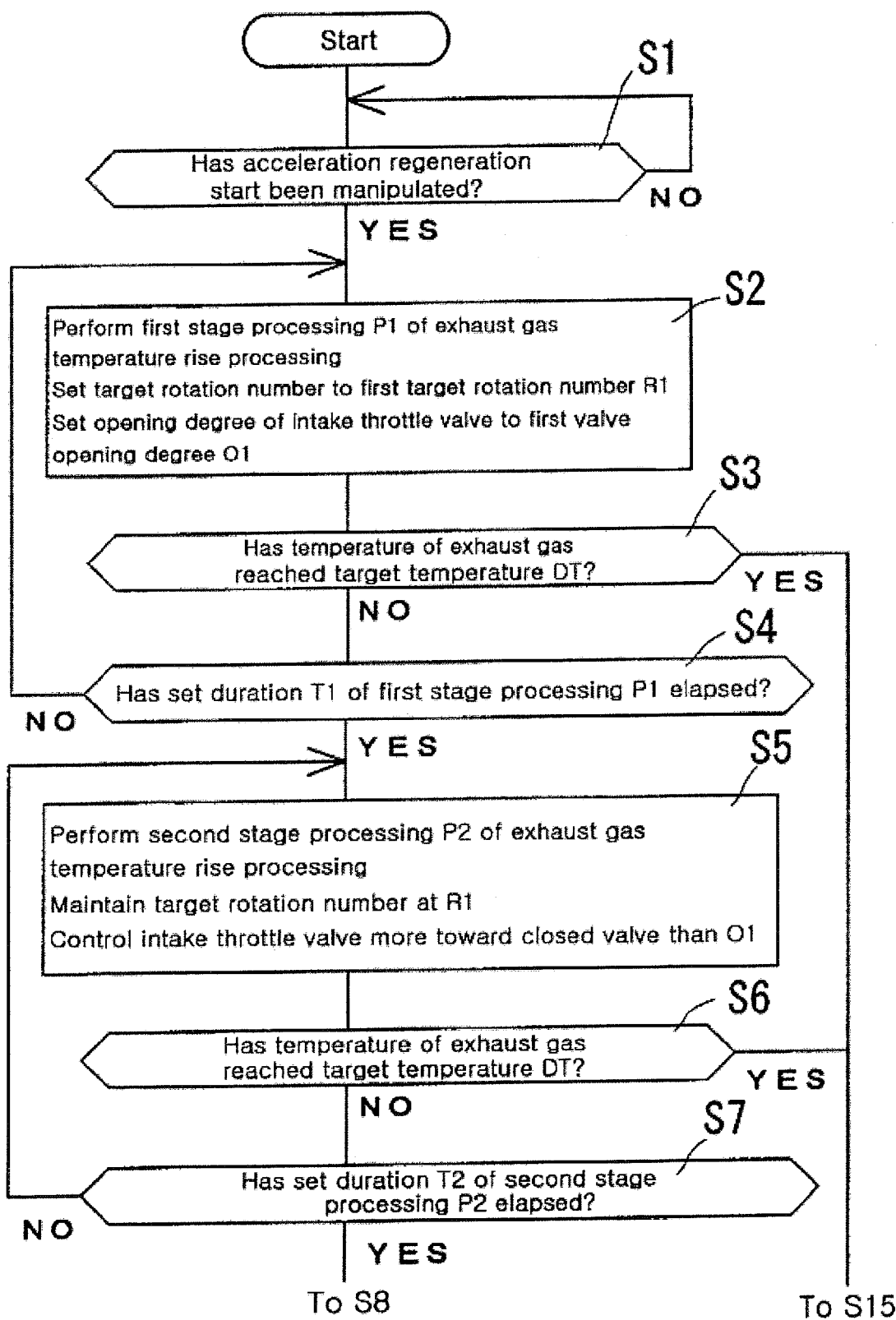
FIG. 3 is part of a flowchart of acceleration regeneration processing using the exhaust treatment device of FIG. 1.

As shown in FIG. 3, at step S1, it is repeatedly determined whether an acceleration regeneration start has been manually manipulated. If, as a result of the determination, it is affirmed that the acceleration regeneration start is manually manipulated, the first stage processing P1 of the exhaust gas temperature rise processing is performed at step S2.

Next, at step S3, it is determined whether the temperature of the exhaust gas 12 on the upstream side of the DOC 10 has reached the target temperature DT. If, as a result of the determination, it is denied that the temperature of the exhaust gas 12 on the upstream side of the DOC 10 has reached the target temperature DT, it is determined whether the set duration T1 of the first stage processing P1 has elapsed at step S4. If, as a result of the determination, it is denied that the set duration T1 of the first stage processing P1 has elapsed, the process returns to step S2. If, as a result of the determination, it is affirmed that the set duration T1 of the first stage processing P1 has elapsed, the process proceeds to step S5.

At step S5, the second stage processing P2 of the exhaust gas temperature rise processing is performed.

Next, at step S6, it is determined whether the temperature of the exhaust gas 12 on the upstream side of the DOC 10 has reached the target temperature DT. If, as a result of the determination, it is denied that the temperature of the exhaust gas 12 on the upstream side of the DOC 10 has reached the target temperature DT, it is determined whether the set duration T2 of the second stage processing P2 has elapsed at step S7. If, as a result of the determination, it is denied that the set duration T2 of the second stage processing P2 has elapsed, the process returns to step S5. If, as a result of the determination, it is affirmed that the set duration T2 of the second stage processing P2 has elapsed, the process proceeds to step S8.

Figure 4:
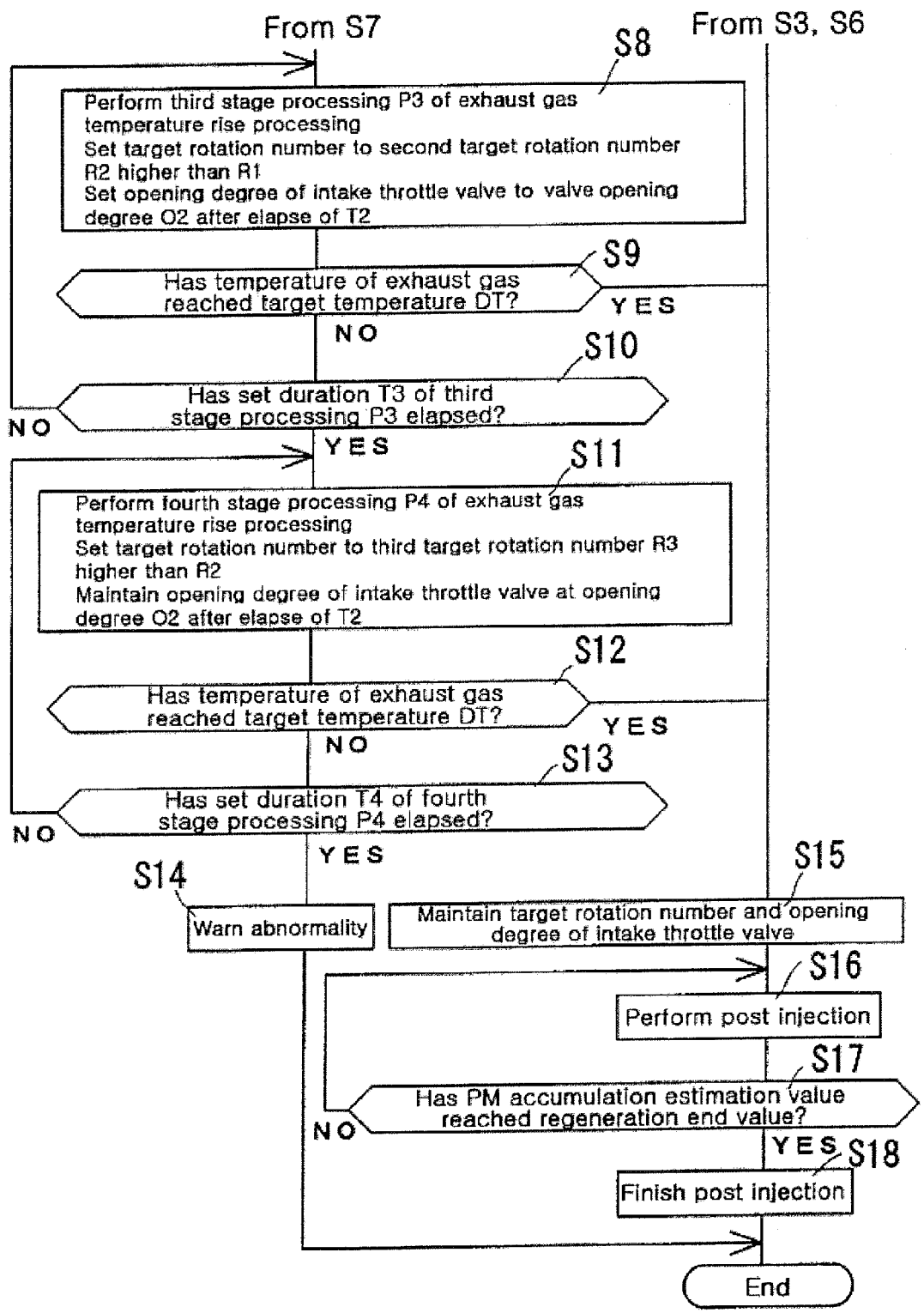
FIG. 4 is a continued part of step S7 of the flowchart of FIG. 3.

As shown in FIG. 4, at step S8, the third stage processing P3 of the exhaust gas temperature rise processing is performed.

Next, at step S9, it is determined whether the temperature of the exhaust gas 12 on the upstream side of the DOC 10 has reached the target temperature DT. If, as a result of the determination, it is denied that the temperature of the exhaust gas 12 on the upstream side of the DOC 10 has reached the target temperature DT, it is determined whether the set duration T3 of the third stage processing P3 has elapsed at step S10. If, as a result of the determination, it is denied that the set duration T3 of the third stage processing P3 has elapsed, the process returns to step S8. If, as a result of the determination, it is affirmed that the set duration T3 of the third stage processing P3 has elapsed, the process proceeds to step S11.

At step S11, the fourth stage processing P4 of the exhaust gas temperature rise processing is performed.

Next, at step S12, it is determined whether the temperature of the exhaust gas 12 on the upstream side of the DOC 10 has reached the target temperature DT. If, as a result of the determination, it is denied that the temperature of the exhaust gas 12 on the upstream side of the DOC 10 has reached the target temperature DT, it is determined whether the set duration T4 of the fourth stage processing P4 has elapsed at step S13. If, as a result of the determination, it is denied that the set duration T4 of the fourth stage processing P4 has elapsed, the process returns to step S11. If, as a result of the determination, it is affirmed that the set duration T4 of the fourth stage processing P4 has elapsed, the process proceeds to step S14.

At step S14, abnormality of the activation of a catalyst is warned, and processing is terminated.

As shown in FIG. 1, the alarm of abnormality of the activation of a catalyst is performed by activation abnormality information alarm means 48. The activation abnormality information alarm means 48 is a lamp provided in the dashboard of a machine on which the diesel engine is mounted. Abnormal information about the activation of a catalyst is alarmed by turning on the lamp.

As shown in FIGS. 3 and 4, at each of steps S3, S6, S9, and S12, it is determined whether the temperature of the exhaust gas 12 on the upstream side of the DOC 10 has reached the target temperature DT. If, as a result of the determination, it is affirmed that the temperature of the exhaust gas 12 on the upstream side of the DOC 10 has reached the target temperature DT, a target rotation number and an opening degree of the intake throttle valve 41 at the time of the affirmation are maintained at step S15 and the post injection is performed at step S16. As shown in FIG. 5, when the PM accumulation estimation value reaches the acceleration regeneration request determination value J2 that is the acceleration regeneration end value, the post injection is terminated at step S18 of FIG. 4, and the acceleration regeneration processing is terminated (St8) as shown in FIG. 5.

DESCRIPTION OF REFERENCE NUMERALS

1: DPF
14: control means
40: DOC upstream-side exhaust gas temperature sensor
41: intake throttle valve
42: fuel addition means
P1: first stage processing
P2: second stage processing
P3: third stage processing
P4: fourth stage processing
T1: set duration of first stage processing
T2: set duration of second stage processing
T3: set duration of third stage processing
T4: set duration of fourth stage processing
O1: first valve opening degree
O2: second valve opening degree
R1: first target rotation number
R2: second target rotation number
R3: third target rotation number

The invention claimed is:

1. An exhaust treatment device for a diesel engine, including a DPF 1, an exhaust gas temperature sensor 40 for detecting a temperature of an exhaust gas 12 on an upstream side of the DPF 1, an intake throttle valve 41, control means 14, and memory means 5, wherein a target temperature DT of the exhaust gas 12 on the upstream side of the DPF 1, a first valve opening degree O1 of the intake throttle valve 41, and set durations T1, T2, T3, and T4 for stage processings of exhaust gas temperature rise processing are stored in the memory means 5, and in regeneration of the DPF 1 by burning and removing PM, accumulated on the DPF 1, by using heat of the exhaust gas 11, the control means 14 performs a first stage processing P1 of the exhaust gas temperature rise processing, wherein in the first stage processing P1, a target rotation number of the engine is set to a predetermined first target rotation number R1 and an opening degree of the intake throttle valve 41 is set to the first valve opening degree O1, if the temperature of the exhaust gas 12 on the upstream side of the DPF 1 does not reach the target temperature DT and the set duration T1 of the first stage processing P1 has elapsed, the control means 14 performs a second stage processing P2 of the exhaust gas temperature rise processing, wherein in the second stage processing P2, the target rotation number of the engine is maintained at the first target rotation number R1 and the opening degree of the intake throttle valve 41 is more closed than the first valve opening degree O1, if the temperature of the exhaust gas 12 on the upstream side of the DPF 1 does not reach the target temperature DT and the set duration T2 of the second stage processing P2 has elapsed, the control means 14 performs stage processings P3 and P4 in and after the third step of the exhaust gas temperature rise processing, wherein in the stage processings P3 and P4 in and after the third step, the opening degree of the intake throttle valve 41 is maintained at a second valve opening degree O2 at the time when the set duration T2 of the second stage processing P2 has reached until the temperature of the exhaust gas 12 on the upstream side of the DPF 1 reaches the target temperature DT, and the temperature of the exhaust gas 12 on the upstream side of the DPF 1 is raised by updating the target rotation number of the engine into target rotation numbers R2 and R3, each higher than each of the target rotation numbers R1 and R2 of the stage processings P2 and P3 right before, based on an elapse of the set durations T3 and T4 of the stage processings P3 and P4.

2. The exhaust treatment device according to claim 1, wherein when the temperature of the exhaust gas 12 on the upstream side of the DPF 1 reaches the target temperature DT, the control means 14 maintains the target rotation numbers R1, R2, and R3 and the opening degrees O1 and O2 of the intake throttle valve 41 at that time for a predetermined time period since that time.

3. The exhaust treatment device according to claim 1, further comprising fuel addition means 42, wherein when the temperature of the exhaust gas 12 on the upstream side of the DPF 1 reaches the target temperature DT, the control means 14 adds unburnt fuel to the exhaust gas 12 on the upstream side of the DPF 1 through the fuel addition means 42 so that the unburnt fuel is burnt by oxygen included in the exhaust gas 12.

4. The exhaust treatment device according to claim 3, wherein a DOC 10 is disposed on the upstream side of the DPF 1, so that the DOC 10 catalytically burns unburnt fuel using oxygen included in the exhaust gas 12.

5. The exhaust treatment device according to claim 1, wherein the exhaust gas temperature rise processing is performed during a non-operation of a machine on which the engine is mounted, in which both driving and working of the machine are stopped, but is not performed during an operation of the machine in which at least one of the driving and working of the machine is performed.

6. The exhaust treatment device according to claim 1, wherein the temperature of the exhaust gas 12 on the upstream side of the DPF 1 is raised even without installing an exhaust throttle valve by controlling the intake throttle valve 41 and step by step updating the target rotation number of the engine.

* * * * *